(12) United States Patent
Günther et al.

(10) Patent No.: US 11,987,192 B2
(45) Date of Patent: May 21, 2024

(54) BUMPER CROSS BEAM FOR A MOTOR VEHICLE

(71) Applicant: Kirchhoff Automotive Deutschland GmbH, Attendorn (DE)

(72) Inventors: Alexander Günther, Olpe (DE); Lena Kremer, Finnentrop (DE); Maria Schmitt, Attendorn (DE); Marco Töller, Cologne (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 307 days.

(21) Appl. No.: 17/636,946

(22) PCT Filed: Sep. 3, 2020

(86) PCT No.: PCT/EP2020/074588
§ 371 (c)(1),
(2) Date: Feb. 21, 2022

(87) PCT Pub. No.: WO2021/043899
PCT Pub. Date: Mar. 11, 2021

(65) Prior Publication Data
US 2022/0363211 A1    Nov. 17, 2022

(30) Foreign Application Priority Data

Sep. 6, 2019  (DE) .................... 10 2019 124 019.0
Sep. 6, 2019  (DE) .................... 10 2019 124 020.4

(51) Int. Cl.
*B60R 19/34* (2006.01)
*B60R 19/02* (2006.01)
*B60R 19/18* (2006.01)

(52) U.S. Cl.
CPC ............ *B60R 19/34* (2013.01); *B60R 19/023* (2013.01); *B60R 19/18* (2013.01); *B60R 2019/1813* (2013.01)

(58) Field of Classification Search
CPC ....... B60R 19/34; B60R 19/023; B60R 19/18; B60R 2019/1813; B60R 19/24; B60R 2019/1806; B60D 1/565
(Continued)

(56) References Cited

U.S. PATENT DOCUMENTS 8,950,794 B2    2/2015  Lenkenhoff et al.
9,187,054 B2 *  11/2015  Handing ............... B60R 19/023
(Continued)

FOREIGN PATENT DOCUMENTS

CN    201296222 Y    8/2009
CN    201613871 U *  10/2010
(Continued)

OTHER PUBLICATIONS

CN-208180972-U computer translation (Year: 2018).*
(Continued)

*Primary Examiner* — Amy R Weisberg
*Assistant Examiner* — Melissa Ann Bonifazi
(74) *Attorney, Agent, or Firm* — Polson Intellectual Property Law P.C.; Christopher Sylvain; Margaret Polson

(57) ABSTRACT

A bumper crossmember for a motor vehicle having a crossmember extending transversely to the longitudinal axis of the vehicle and two crashboxes connected thereto. Each crashbox is connected with its end facing away from the vehicle to the crossmember in a respective end section thereof, and with its end facing the vehicle is connectable to a structural component of the vehicle, e.g., a longitudinal member. The crossmember has a corrugated structure in the area where a crashbox is connected. A tow sleeve is inte- (Continued)

grated into the bumper crossmember in the connection area of the crashbox. The tow sleeve is held in a vertex structure of the corrugated structure in a form-fitting manner in the z and y directions, the vertex area of this vertex structure facing away from the crashbox, with the lateral surface of the tow sleeve on the flanks facing one another and forming the vertex structure.

14 Claims, 3 Drawing Sheets

(58) Field of Classification Search
USPC .......................................................... 293/133
See application file for complete search history.

(56) References Cited

U.S. PATENT DOCUMENTS

| | | | |
|---|---|---|---|
| 9,446,799 B2 | 9/2016 | Franzpötter | |
| 9,598,100 B2 | 3/2017 | Lenkenhoff | |
| 9,764,764 B2 | 9/2017 | Irle | |
| 10,005,495 B2 | 6/2018 | Töller | |
| 10,577,025 B2 | 3/2020 | Michler | |
| 10,882,559 B2 | 1/2021 | Gündogan | |
| 11,142,248 B2 | 10/2021 | Günther | |
| 11,148,623 B2 | 10/2021 | Günther | |
| 11,235,720 B2 | 2/2022 | Honing et al. | |
| 11,292,409 B2 | 4/2022 | Töller | |
| 11,505,146 B2 | 11/2022 | Weige | |
| 2009/0295177 A1* | 12/2009 | Asplund | B60R 19/18 293/132 |
| 2012/0292930 A1* | 11/2012 | Hermanson | B60D 1/565 29/428 |
| 2015/0102614 A1* | 4/2015 | Arns | B60R 19/18 293/102 |
| 2017/0096171 A1 | 4/2017 | Frost et al. | |
| 2019/0344385 A1 | 11/2019 | Töller | |
| 2020/0254948 A1 | 8/2020 | Toller et al. | |
| 2021/0221311 A1 | 7/2021 | Weige | |
| 2022/0009435 A1 | 1/2022 | Gunther | |
| 2022/0024399 A1 | 1/2022 | Tlauka | |
| 2022/0281532 A1 | 9/2022 | Tentscher | |
| 2022/0289304 A1 | 9/2022 | Weige | |
| 2022/0297524 A1 | 9/2022 | Günther | |
| 2022/0314912 A1 | 10/2022 | Töller | |

FOREIGN PATENT DOCUMENTS

| | | | | |
|---|---|---|---|---|
| CN | 104629070 A | | 5/2015 | |
| CN | 105216722 A | | 1/2016 | |
| CN | 105966337 A | | 9/2016 | |
| CN | 208180972 U | * | 12/2018 | |
| DE | 19517922 A1 | | 11/1996 | |
| DE | 19635285 A1 | | 3/1997 | |
| DE | 10346903 B3 | | 5/2005 | |
| DE | 102004008741 A1 | | 7/2005 | |
| DE | 202007018727 U1 | | 4/2009 | |
| DE | 102010013283 A1 | | 9/2011 | |
| DE | 102013100720 A1 | | 7/2014 | |
| EP | 1361082 A1 | | 11/2003 | |
| WO | 2011075031 A1 | | 6/2011 | |
| WO | 2011123012 A1 | | 10/2011 | |
| WO | 2012158411 A1 | | 11/2012 | |
| WO | 2017044035 A1 | | 3/2017 | |
| WO | WO-2017111682 A1 | * | 6/2017 | ........... B60R 19/023 |
| WO | 2012043896 A1 | | 3/2021 | |
| WO | 2021043899 A1 | | 3/2021 | |

OTHER PUBLICATIONS

CN-201613871-U computer translation (Year: 2010).*
Examination report dated May 18, 2023 in related Chinese application 2020800622238.0.
International Search Report dated Mar. 11, 2021 in parent International application PCT/EP2020/074588.
Written Opinion of the International Searching Authority dated Mar. 11, 2021 in parent International application PCT/EP2020/074588. Note: Machine translation provided. Consult official WIPO translation if unclear.
Examination Report dated Jul. 27, 2020 in related German application DE 10 2019 124 020.4. Machine translation provided.
Pending U.S. Appl. No. 17/621,806 filed Dec. 22, 2021. Per rule 609.07.

* cited by examiner

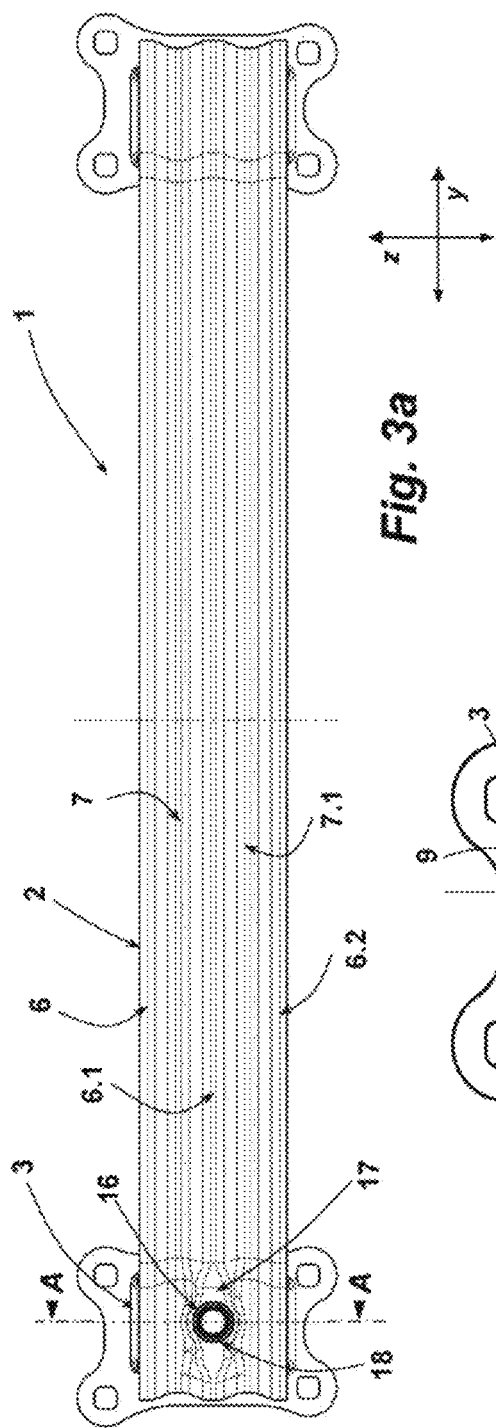
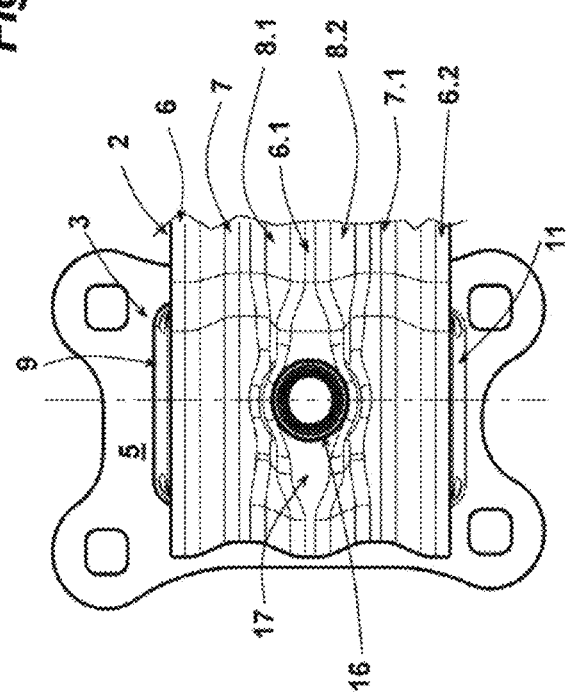
Fig. 3a
Fig. 3b

BUMPER CROSS BEAM FOR A MOTOR VEHICLE

BACKGROUND

The present disclosure relates to a bumper crossmember for a motor vehicle with a crossmember extending transversely to the longitudinal axis of the vehicle and with two crashboxes connected thereto, each crashbox is connected with its end facing away from the vehicle to the crossmember in a respective end section of the crossmember, and with its end facing toward the vehicle to a structural component belonging to the vehicle, in particular to a longitudinal member, wherein the crossmember has a corrugated structure in the area of the connection of a crashbox, and a tow sleeve, which is integrated into the bumper crossmember in the connection area of the crashbox.

A bumper crossmember acts to protect assemblies located on the vehicle side behind the bumper crossmember, as well as the passenger compartment in the event of a collision, in particular a head-on collision. The bumper crossmember has a crossmember, whose longitudinal extension is transverse to the direction of travel (x direction) of the vehicle, thus extending in the y direction. Energy absorption components, known as crashboxes, are connected to the crossmember at its two end sections. These are supported at the rear of the crossmember with their end facing away from the vehicle. The other end of the crashbox points toward the vehicle and is connectable or connected to a structural component of the vehicle, typically a side member. Part of such a crashbox is in many cases a baseplate at its end facing the vehicle. The surface of such a baseplate extends beyond the lateral surface of the crashbox in the manner of a flange. Mounting openings are made therein in order to connect the bumper crossmember to the structural component on the vehicle side.

Crashboxes are used to absorb impact energy by defined reshaping thereof. Thus, the energy to be absorbed is converted into forming energy. Crashboxes can be made of an aluminum alloy suitable for this purpose, in that case typically as hollow chamber sections. Crashboxes may also be made of steel components, in that case typically by two half-shells adjoining each other with their longitudinal joints, and mostly U-shaped in cross-section. Steel crashboxes typically have structures that affect wrinkling, e.g., beads, or the like.

A tow sleeve is integrated into such bumper crossmembers in the area of the left and/or right end section. For this purpose, the crossmember has a corresponding opening into which the tow sleeve is inserted and welded to the crossmember. The tow sleeve is usually integrated into the bumper crossmember in the connection area of the crashbox. In the case of a crossmember with a forwardly open hat-shaped cross-sectional geometry, it is generally closed on its side facing away from the vehicle by a strike plate in order in this way to form a hollow chamber profile. In such design, the tow sleeve passes in the x direction through the crossmember in the area of its rear wall and the strike plate. If the crossmember does not have two walls spaced apart in the x direction, additional stiffening elements must be attached to the crossmember in order to be able to connect a tow sleeve thereon. This is necessary since such a tow sleeve integrated in a bumper crossmember must also be able to withstand forces acting transversely to its longitudinal axis. Such a tow sleeve is welded to the crossmember at the front and back. For this purpose, the tow sleeve must be held in an exact position in the two openings of the crossmember, which are aligned with each other in the x direction, be it the crossmember with a strike plate or the crossmember with an additional stiffening element, in order for the welding process to be carried out.

When the tow sleeve is integrated into a bumper crossmember in this way, the forces acting thereon in the x direction are absorbed via the weld seams. Transverse forces are absorbed by the plates spaced in the x direction, i.e., the rear wall of a top hat section, and the strike plate or crossmember and the stiffening element. Thus, the integration of a tow sleeve into a bumper crossmember requires a corresponding amount of installation space in the x direction due to the necessary spacing of the two crossmember elements on which the tow sleeve is connected. Crossmembers of such a bumper crossmember sometimes have a corrugated structure aligned in the vertical direction (z-direction), which extends into its end sections. As a result, the bumper crossmember already has a certain extension in the x direction in the section in which a tow sleeve is to be integrated. Such structuring of a crossmember for a bumper crossmember is known from FIG. 3 of DE 10 2013 100 720 A1. In this design, in particular the vertex structure facing away from the vehicle and which is located at the bottom is provided with a special height. This determines the extension of the crossmember in this section in the x direction. In order to connect a tow sleeve in this section of the crossmember, the body height at the rear must be increased by an additional stiffening element, if two-point support of the tow sleeve, as described above, is desired. However, this increases the overall structure of the crossmember, which is undesirable in some applications.

US 2017/0096171 A1 shows a bumper crossmember for a motor vehicle with a cross member extending transversely to the longitudinal axis of the vehicle and with two crash boxes connected thereto, wherein the crash boxes can be connected to a vehicle. This bumper crossmember has a corrugated structure in the connection area of the crashboxes and, moreover, FIG. 3 B, section C-C discloses an unspecified tow sleeve, which is formed in the connection area of the crashbox integrated in the bumper crossmember.

SUMMARY

Proceeding from this background, an aspect of the present disclosure is based on further designing a bumper crossmember of the type mentioned at the outset, such that the weld seams of the tow sleeve are less heavily loaded and the tow sleeve is integrated into the bumper crossmember with sufficient transverse force support, without the structure having to be enlarged in the x direction for this purpose.

This is provided according to the present disclosure by a bumper crossmember of the generic type mentioned at the outset according to US 2017/0096171 A1, in which the tow sleeve is held in a form-fitting manner in the z- and y-directions in a vertex structure of the corrugated structure, the vertex structure having a vertex area facing away from the crashbox, with a lateral surface of the tow sleeve on the flanks of corrugated structure which face one another and form the vertex structure.

In this bumper crossmember, the corrugated structure present in the area of integration of the tow sleeve, provided for example by a bead extending longitudinally in the y- or z-direction, is used in a skillful manner. The tow sleeve is integrated into the corrugated structure, such that it is fitted between the flanks of a vertex structure facing away from the crashbox and is held in a form-fitting manner therein in the z and y directions. According to one embodiment, this form-fitting connection between the tow sleeve and the crossmember is free of play. This is possible, e.g., in an embodiment in which the crossmember and the tow sleeve are aluminum parts. If the crossmember and/or tow sleeve are designed in steel, it will generally be necessary to coat the bumper crossmember for corrosion protection reasons by typically using a cathodic dip coating. In such a case, coating material should also reach between the lateral surface of the tow sleeve and the areas of the crossmember providing the form fit. This way, the tow sleeve with its lateral surface will be placed at a small distance from the corrugated structure of the crossmember, such that the coating material can penetrate into the latter during the coating process. Here, too, the tow sleeve is held in a form-fitting manner in the vertex structure in the said directions, and specifically with the clearance provided for the gap dimension. Instead of providing a gap between the lateral surface of the tow sleeve and the vertex structure of the crossmember, a sealing and/or adhesive compound can be provided between the lateral surface of the tow sleeve and the areas of the crossmember providing the positive fit. Here, too, the tow sleeve is also fitted in a form-fitting manner into the vertex structure in the z and y directions.

In a further development, and irrespective of whether the form-fitting connection in the z and y directions is provided without or with play, a form-fitting connection is provided also in the x direction. The flanks forming the vertex structure extend in the y- or z-direction, depending on the design of the corrugated structure. When the tow sleeve is fitted between the flanks, it is thus held in a form-fitting manner in this direction solely by bearing against these flanks. In the area where the tow sleeve fits between the flanks of such a vertex structure, these flanks are designed such that they contact the vertex of the tow sleeve located transversely to the extension of the flanks, as well as the areas adjacent to this vertex in the direction of the course of the flanks. Thus, the tow sleeve also fits in a form-fitting manner into the vertex structure in the transverse direction to the longitudinal course of the corrugated structure. The flanks of such a vertex structure have a certain, preferably straight, extension in the x direction, such that contact of the lateral surface of the tow sleeve is possible over a certain extension in the x direction, which contact surface is several times larger in the x direction than the contact of the wall areas enclosing a tow sleeve opening. For this reason, the prior art discussed at the outset requires two such spaced-apart wall areas in order to hold the tow sleeve. This flat contact may be limited to the vertex areas directed transversely to the longitudinal extension of the flanks, which include the actual vertex of the tow sleeve. According to one embodiment, the contact surface on each flank extends over 35 to 60 degrees, in particular over about 50 degrees, and thus about 25 degrees in either direction starting from the vertex line.

With such an integration of the tow sleeve into the bumper crossmember, only a single weld is required, as opposed to the prior art discussed at the outset. This will typically be done at the front and thus in the area of the vertex structure.

In order to provide the above-described positive fit of the tow sleeve against the flanks of a vertex structure facing one another, one example embodiment provides that the vertex structure has a greater width (direction transverse to the longitudinal extension of the vertex structure) in the area of the tow sleeve aperture than in the adjacent areas of the vertex structure.

One example embodiment provides that the adaptation of the flanks to the lateral surface of the tow sleeve does not extend into the vertex area of the vertex structures adjacent to the vertex structure having the tow sleeve aperture.

The flanks of a vertex structure carrying the tow sleeve are preferably inclined toward each other in the direction of the tow sleeve aperture, i.e., do not extend horizontally. The inclination relative to the horizontal need only be a few angular degrees, e.g., 2-5 degrees. Of importance here is that in such a design of the flanks, the contact surface areas extending to the tow sleeve aperture taper conically, and that in such an embodiment the tow sleeve has a flank contact surface formed with complementary conicity, which is typically part of the lateral surface. This flank contact surface of the tow sleeve may be the conical lateral surface of a collar projecting from the otherwise cylindrical lateral surface of the tow sleeve.

An expedient design of the bumper crossmember is one in which the tow sleeve aperture is formed by wall sections of the vertex structure of the crossmember, which rest with their abutment against the lateral surface of the tow sleeve, preferably at a distance in the axial direction from the inside flank abutment. Thus, in the case of transverse forces acting on the tow sleeve, the transfer of force to the crossmember is further improved.

In such a bumper crossmember, the tow sleeve is integrated into the connection area of the crashbox. Preferably, the rear of the vertex structure supporting the tow sleeve is enclosed by the walls of the crashbox connected to the rear of the crossmember. In this case, use is made of the properties of the crashbox connected to the rear of the crossmember, whereby the vertex structure supporting the tow sleeve is stiffened above all in the transverse direction relative to the longitudinal extension of the vertex structure, which therefore meets the requirements placed on a transverse load solely on account of the skillful integration into the bumper crossmember and thus without any additional steps.

According to one embodiment of such a bumper crossmember, the crashbox enclosing the connection area of the tow sleeve with its walls is supported with its upper and lower end-face area continuously or at least substantially continuously on flanks of the corrugated structure and connected thereto. In such an embodiment, the corrugated structure extends in the vertical (z-direction).

This support of the crashbox on the crossmember may also be implemented for crossmembers having a corrugated structure aligned in the vertical direction (z-direction). Such cross-members are also sometimes used, as their corrugated structure affords them greater rigidity. The alignment of the corrugated structure in the vertical direction requires that the corrugated structure comprises the following vertex structures along the longitudinal extension of the crossmember, specifically at least three vertex structures in the same direction, i.e., three vertex structures pointing in the same direction. Two adjacent vertex structures are each connected to one another by a flank, which is inclined relative to a horizontal. According to one embodiment, in such a crossmember, the upper and lower end-face portions of each crashbox are supported on such a flank, and preferably on a flank pointing in the vertical direction. In such a design, the upper flank on which the upper end-face area is supported points in the vertical direction. The lower flank, on which the lower end-face area is supported, points downward in the vertical direction. In such a design, the upper and lower end-face areas supported on the upwardly pointing flanks are easily accessible in order to connect the crashbox to the rear of the crossmember along these supported end-face areas in a material-locking manner, typically by welding the two parts together. Preferably, the lateral end-face areas of the crashboxes carry a support lug projecting toward the rear of the crossmember. It engages in an apex structure located between the two outer vertex structures. In it, however, the support lug is only supported on the two flanks facing one another, whereby this central vertex structure is connected to the two outer vertex structures. Depending on the length of the contact surface of such a support lug with such a flank of the crossmember, the deformation behavior in the first phase of a deformation process can be influenced. Thus, with such a design of the bumper crossmember, at least the vertex structures facing the crashbox are not supported on the face of the crashbox. Support in the unsupported end-face areas of the crashbox takes place after an initial deformation phase, provided deformation in the crashbox was already initialized via the supported end-face areas.

The directional indications used in this context, i.e., the x direction, y direction and z-direction, are the directional indications normally used in a vehicle. The x direction represents the longitudinal extension of the vehicle. The y direction is the transverse extension of the vehicle in the direction of its width. The z direction is the vertical direction.

BRIEF DESCRIPTION OF THE DRAWINGS

The following description is provided on the basis of an example embodiment with reference to the accompanying drawings, wherein:

FIG. 4 shows a sectional view through the bumper crossmember along line A-A of FIG. 3a.

DETAILED DESCRIPTION

Figure 1:
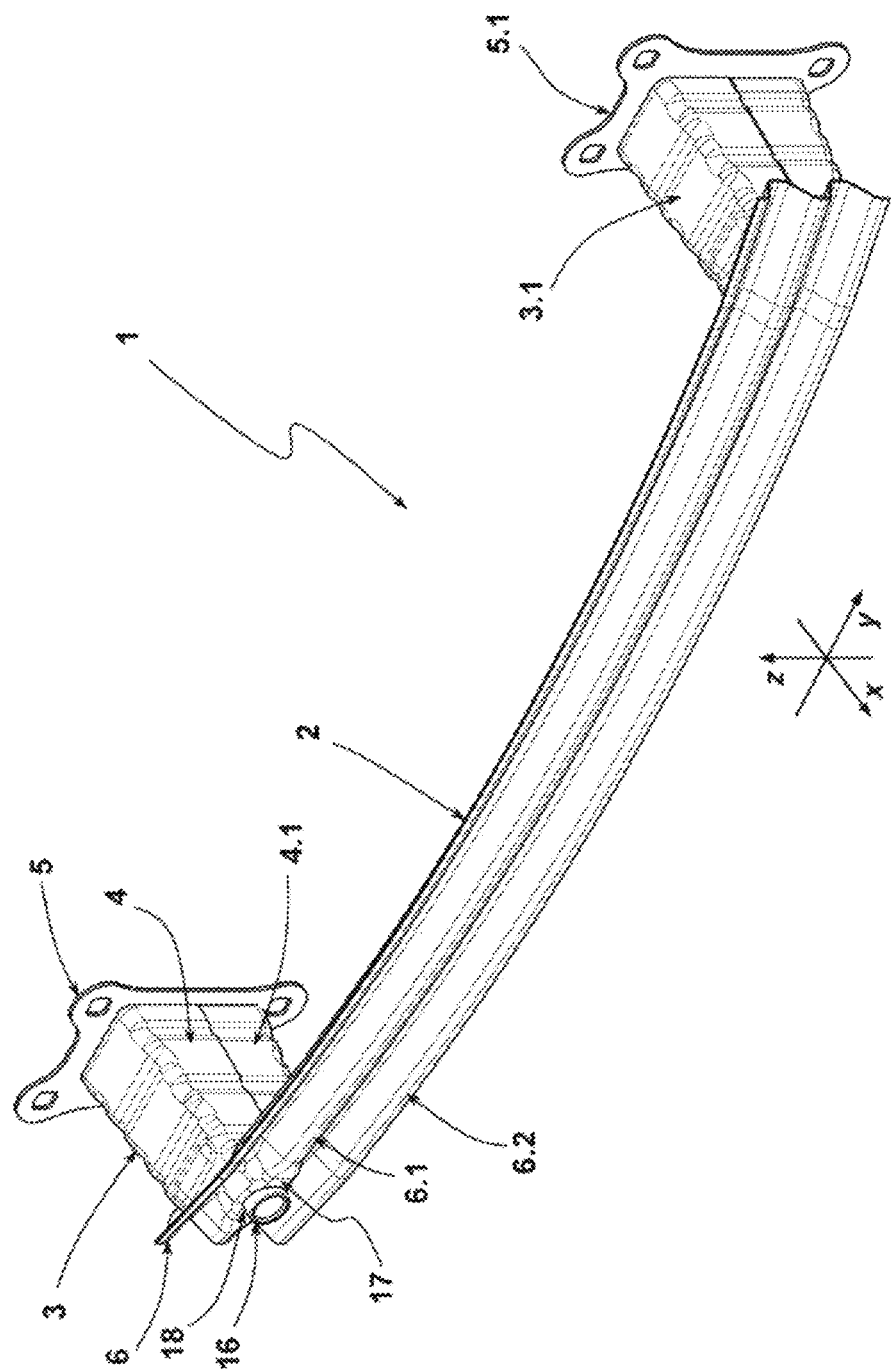
FIG. 1 shows a perspective view of a bumper crossmember.

With reference to FIG. 1, a bumper crossmember 1 comprises a crossmember 2 to which a crashbox 3, 3.1 is connected in the area of either end. The crossmember 2 of the bumper crossmember 1 has a corrugated structure aligned in the z-direction. The profiling of the corrugated structure extends with its vertex structures in the longitudinal direction of the crossmember 2. The crossmember 2 is a press-formed steel component.

Crashbox 3—crashbox 3.1 is of identical design—is composed of two U-shaped half shells 4, 4.1, each press-formed from a steel blank. The two half shells 4, 4.1 adjoin each other with their longitudinal joints and are welded together at this point. At the end facing a vehicle not shown in the figures, the crashbox 3 carries a so-called baseplate 5, with which the bumper crossmember 1 is connected to a vehicle side member in the embodiment shown.

Figure 2:
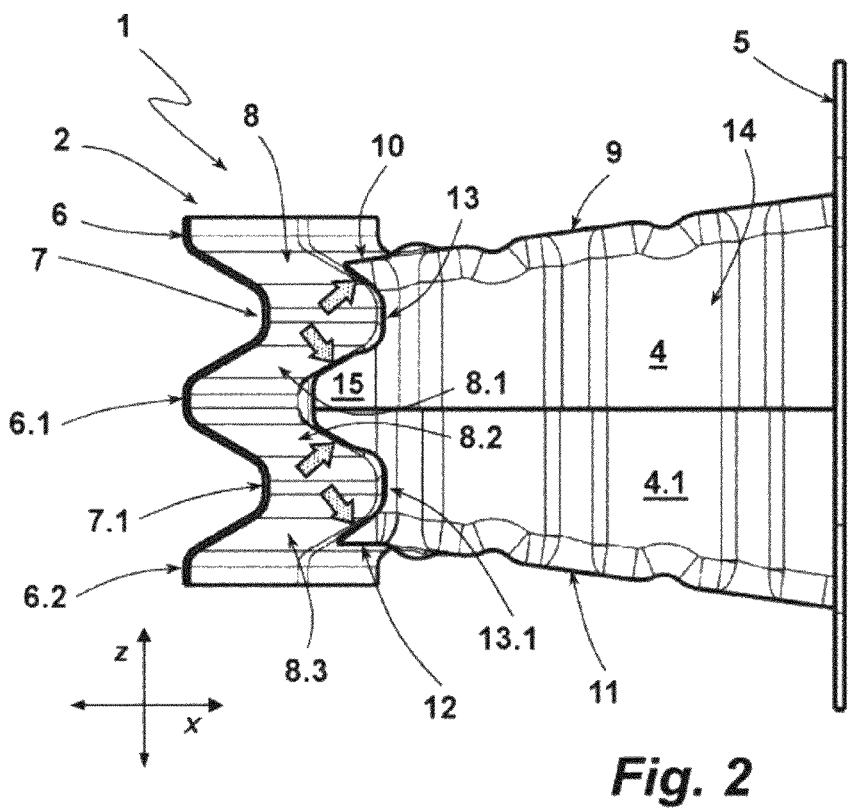
FIG. 2 shows a cross-sectional view through the bumper crossmember of FIG. 1 with a line of intersection at the center of its longitudinal extension, as viewed in the direction toward the left end shown in FIG. 1, FIGS. 3a and 3b show a front side view of the bumper crossmember of FIG. 1 (FIG. 3a) and an enlarged view of its left end section (FIG. 3b)

Due to the profiling of the crossmember 2 in the vertical direction, as shown in FIG. 1, the end face of the crashbox 3 facing the rear of the crossmember 2 is also profiled accordingly, as can be seen in FIG. 2.

As is seen more clearly in FIG. 2, the corrugated structure of the crossmember 2 has three positive vertex structures 6, 6.1, 6.2 facing away from the vehicle, as well as two intermediate negative vertex structures 7, 7.1 in the form of recesses opposite the positive vertex structures 6, 6.1, 6.2. In the direction toward the crashbox 3, the negative vertex structures 7, 7.1 represent the positive vertex structures, and the vertex structures 6, 6.1, 6.2 represent the negative vertex structures, in that these recede with in relation to the vertex structures 7, 7.1. Adjacent vertex structures are connected to one another by means of a flank 8, 8.1, 8.2, 8.3, respectively. These flanks 8, 8.1, 8.2, 8.3 are inclined relative to the horizontal at about 30 degrees in the embodiment shown.

The contouring of the end face of the crashbox 3 facing the crossmember 2 is designed, such that the upper end-face area 10 provided by the upper wall 9 and the lower end-face area 12 provided by the lower wall 11 are each supported over their extension in the y direction on a flank 8, 8.3 facing in the vertical direction and joined to the latter by a welded joint. The area of support of the upper and lower end-face areas 10, 12 on the flank 8 and 8.3, respectively, is indicated in FIG. 2 by a block arrow. In contrast, the vertex structure 7, 7.1 facing the crashbox 3 is not supported on the complementary contour 13, 13.1 in the end-face design of the crashbox 3.

The two side walls 14 of the crashbox 3, of which only the side wall 14 is visible in FIG. 1, carry a support lug 15 projecting in the direction of the longitudinal extension of the crashbox 3 in the direction of the crossmember 2. This support lug 15 engages in the negative vertex structure 6.1 located between the vertex structures 7, 7.1 when viewed from the direction of the crashbox 3. With regard to its outline geometry, which is visible in FIG. 2, the support bracket 15 is designed such that it is supported only on the inclined flanks 8.1, 8.2 facing one another. Each of these support areas are also indicated by a block arrow. The vertex of the support lug 15 facing the crossmember 2 is in turn spaced apart from the vertex structure 6.1.

In the case of impact energy absorption, as indicated by the block arrow in FIG. 2, the impact energy is initially introduced in the crashbox 3 only in the end-face areas located on the flanks 8, 8.1, 8.2, 8.3. Only when the end-face areas supported directly on the rear of the crossmember 2 have begun to deform, i.e., are deformed in the direction of the base plate 5, do the vertex structures 6.1, 7, 7.1 come into contact with the complementary geometries 13, 13.1, as well as the vertex of the support bracket 15, with their sides facing the crashbox 3. Only then, the crashbox 3 becomes deformed over its whole cross-sectional area facing the crossmember 2 for further energy absorption.

The design of the crashbox 3 support shown in FIG. 2 with its end facing away from the vehicle at the rear of the crossmember 2 indicates that the distance between the vertex structures 7, 7.1 to the complementary geometries 13, 13.1 of the crashbox 3 is less than the distance of the vertex of the support lug 15 to the vertex structure 6.1. Thus, an initial application of force until an application of force over the whole cross-sectional area of the crashbox is devised in three stages from the crossmember 2 to the crashbox. While at the beginning of a first deformation phase, energy is only applied to the crashbox 3 via the upper and lower end-face areas 10, 12, after the first deformation phase of the crashbox 3, the vertices 7, 7.1 come into contact against the complementary geometries 13, 13.1 of the crashbox 3, such that these support areas are also included in the further deformation. Only after further deformation does the side of the vertex structure 6.1 facing the crashbox 3 come into contact with the vertex of the support bracket 15. Subsequently, a force is applied to the crashbox 3 over its whole cross-sectional geometry.

The above-described design of the bumper crossmember 1 results in a substantially reduced initial peak, if the deformation behavior described above is plotted in a force-displacement diagram.

A tow sleeve 16 is integrated into the bumper crossmember 1 in its left end section. The tow sleeve 16 protrudes slightly from the front of the crossmember 2 and thus from its side facing away from the vehicle. The purpose of the tow sleeve 16 is to fasten a tow hook or tow eye therein, such that the vehicle to which the bumper crossmember 1 is connected may be towed, if necessary.

The tow sleeve 16 is located within the connection area of the crashbox 3 to the crossmember 2, as shown in the front views of FIGS. 3a and 3b. The tow sleeve 16 is located in the center of the end face enclosed by the walls 9, 11, 14 of the crashbox 3. The tow sleeve 16 is integrated in the corrugated structure of the crossmember 2, specifically in the vertex structure 6.1 with its vertex or vertex area facing away from the crashbox 3. The vertex structure 6.1 has a vertex surface 17, which is widened in the vertical direction (z-direction) in the area around the tow sleeve 16. In the example embodiment shown, the vertex surface 16 is designed to be non-curved. Thus, this vertex surface 17 differs from the otherwise curved vertex area of vertex structure 6.1. A tow sleeve aperture 18 is introduced into the widened vertex surface 17 of the vertex structure 6.1. Due to the widening of the vertex surface 17 of the vertex structure 6.1 in the area of the edging of the tow sleeve 16, and since the vertex areas of the adjacent vertex structures 7, 7.1 are unaffected by the widening of the vertex surface 17, the flank formation differs from that of the adjacent sections. The flanks 8.1, 8.2 forming the vertex structure 6.1 are adapted to the diameter of the tow sleeve aperture 18, such that their wall sections facing one another enclose the lateral surface of the tow sleeve 16 in its upper and lower vertex areas (see in particular FIG. 3b). In the illustrated embodiment, the tow sleeve 16 is bordered externally by the relevant flank sections of the flanks 8.1, 8.2 over approximately 50 degrees, wherein the upper and lower vertex lines of the tow sleeve 16 are preferably located centrally in this border section.

Figure 4:
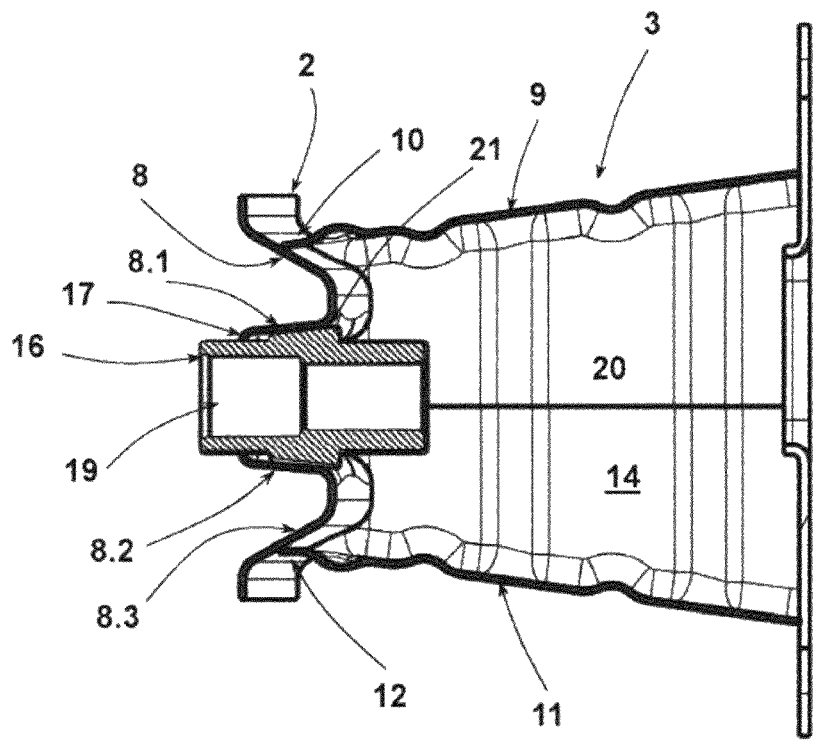

As can be seen in FIG. 4, the tow sleeve 16 is basically a cylindrical component with a front insertion opening 19 and a rear section with an internal thread 20. The thread of a tow eye or tow hook is fastened to the internal thread 20. The tow sleeve 16 carries a collar 21 projecting from its cylindrical outer surface, wherein the outer surface of said collar 21 is inclined conically in the direction of the tow sleeve aperture 18 in accordance with the inclination of the flank sections of the flanks 8.1, 8.2 enclosing the tow sleeve 16. As can be seen in FIG. 4, it has a longitudinally axial, straight extension (x direction), and thus bears at least substantially along the full height of these curved flank sections of the flanks 8.1, 8.2 against the lateral surface of the collar 21 of the tow sleeve 16.

The tow sleeve aperture 18 is introduced into the vertex surface 17 of the vertex structure 6.1. As a result, the curved sections to the flanks 8.1, 8.2 remain and thus the wall sections of the vertex structure 6.1 enclosing the tow sleeve aperture 18 abut against the front cylindrical portion of the tow sleeve 16. The tow sleeve 16 is thus supported in the vertex structure 6.1 via a two-point support, wherein the rear support in the direction of the crashbox 3 is the above-described flat support. The hole edge area of the tow sleeve aperture 18 is located at a certain distance in the x direction from the collar 21.

Enclosing the tow sleeve 16 on the lateral surface of its collar 21 in its upper and lower vertex areas provides effective two-point support for the tow eye 16 circumferentially in the transverse direction, which is the reason for the particular transverse force loading of this section sleeve 16.

Due to the conical support of the tow sleeve 16 with its conical lateral surface of the collar 21 on the inner sides of the flanks 8.1, 8.2, the tow eye 16 can be inserted in this vertex structure 6.1 from the side of the crossmember 2 facing the vehicle and is initially frictionally held therein. Instead of a frictional connection, the tow sleeve 16 may also be bonded with the lateral surface of its collar 21 to the inner sides of the flanks 8.1, 8.2. This facilitates assembly of the tow sleeve 16 in or on the crossmember 2, during which assembly, the tow sleeve 16 is welded to the vertex surface 17 of the vertex structure 6.1, typically in a circumferential fashion. This is done in the circumferential groove between the section of the tow sleeve 16 projecting from the vertex structure 6.1 and the outside of the vertex surface 17.

The corrugated structure is stiffened in the connection area of the crashbox 3 by connecting the latter thereto. This applies in particular to the vertex structure 6.1. Due to the connection of the crashbox 3 with its upper end area 10 to the flank 8, and with its lower end area 12 to the flank 8.3, and due to the engagement of the support lug 15 in the mutually facing flanks 8.1, 8.2 of the vertex structure 6.1 carrying the tow sleeve 16, transverse forces acting in the vertical direction (z-direction) on a tow eye inserted in the tow sleeve 16 may also be absorbed without deformation.

REFERENCE NUMERAL LIST

1 Bumper crossmember
2 Crossmember
3, 3.1 Crashbox
4, 4.1 Half shell
5. Baseplate
6, 6.1, 6.2 Vertex structure
7, 7.1 Vertex structure
8, 8.1-8.3 Flank
9 Wall
10 upper face
11 Wall
12 lower front
13, 13.1 Complementary contour
14 Side wall
15 Support lug
16 Tow sleeve
17 Vertex area
18 Tow sleeve aperture
19 Insertion opening
20 Internal thread
21 Collar

The invention claimed is:

1. A bumper crossmember for a motor vehicle, wherein an x-direction corresponds to a longitudinal extension of the vehicle, a y-direction corresponds to a transverse extension of the vehicle, and a z-direction corresponds to a vertical direction, the bumper crossmember comprising:

a crossmember having a longitudinal extension extending in the y-direction and two crashboxes connected thereto in respective end sections of the crossmember, the crashboxes each having a first end connected to the crossmember and an opposite second end configured to be connected to a structural component of the vehicle, wherein the crossmember has a corrugated structure in a connection area of at least one of the crashboxes, and a tow sleeve integrated in the bumper crossmember in the connection area of the crashbox, wherein the tow sleeve is held in the corrugated structure in a form-fitting manner in the z-direction and in the y-direction in a vertex structure of the corrugated structure, the vertex structure having a vertex area pointing away from the crashbox, with a lateral surface of the tow sleeve on flanks of the corrugated structure facing one another and forming the vertex structure.

2. The bumper crossmember of claim 1, wherein the vertex structure has a vertex surface which is widened in the z-direction in an area around the tow sleeve.

3. The bumper crossmember of claim 1, wherein vertex areas of vertex structures adjacent to the vertex structure carrying the tow sleeve are unaffected by accommodation of the tow sleeve.

4. The bumper crossmember of claim 1, wherein the flanks forming the vertex structure carrying the tow sleeve are inclined toward one another relative to a horizontal in a direction pointing away from the crashbox.

5. The bumper crossmember of claim 1, wherein the tow sleeve has a collar with a conical lateral surface as flank contact for the flanks.

6. The bumper crossmember of claim 5, wherein a tow sleeve aperture is formed in the vertex structure of the crossmember for the tow sleeve to pass through, and wall sections of the vertex structure forming the tow sleeve aperture abut against an outer surface of the tow sleeve.

7. The bumper crossmember of claim 6, wherein abutment of the tow sleeve aperture against the outer surface of the tow sleeve is provided at a distance in the x-direction from the collar.

8. The bumper crossmember of claim 1, wherein a tow sleeve aperture is formed in the vertex structure of the crossmember for the tow sleeve to pass through, and wall sections of the vertex structure forming the aperture abut against an outer surface of the tow sleeve.

9. The bumper crossmember of claim 1, wherein the corrugated structure of the crossmember is aligned in the z-direction, and the corrugated structure comprises at least three vertex structures following the longitudinal extension of the crossmember, wherein two vertex structures adjacent in the z-direction are connected to one another by a flank inclined relative to a horizontal, and upper and lower end-face areas of the crashbox are supported on flanks of the corrugated structure.

10. The bumper crossmember of claim 9 wherein the upper end-face area is supported on an upper flank which faces upward in the z-direction and the lower end-face area is supported on a lower flank which faces downward in the z-direction.

11. The bumper crossmember of claim 10, wherein the first end of the crashbox has a support lug which projects toward a rear side of the crossmember and which is only supported on the flanks facing one another and forming the vertex structure carrying the tow sleeve, each of said flanks connecting the vertex structure carrying the tow sleeve to an adjacent vertex structure of the corrugated structure.

12. The bumper crossmember of claim 11, wherein the crashbox is connected by joining to the crossmember only along its support on the crossmember.

13. The bumper crossmember of claim 10, wherein the crashbox is connected by joining to the crossmember only along its support on the crossmember.

14. The bumper crossmember of claim 9, wherein the crashbox is connected by joining to the crossmember only along its support on the crossmember.

* * * * *